United States Patent Office 3,100,037
Patented Aug. 6, 1963

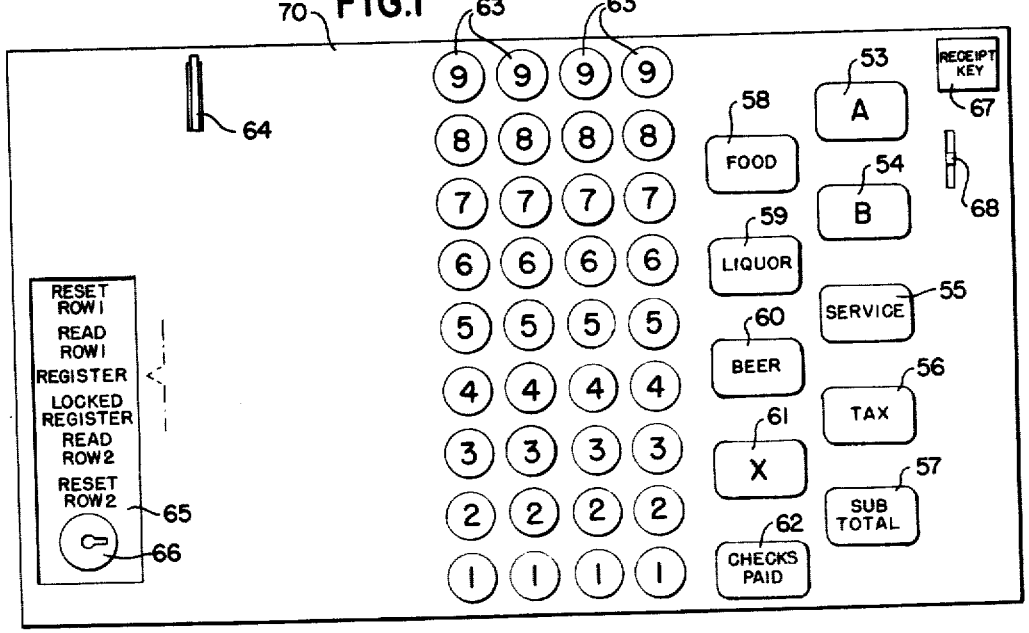

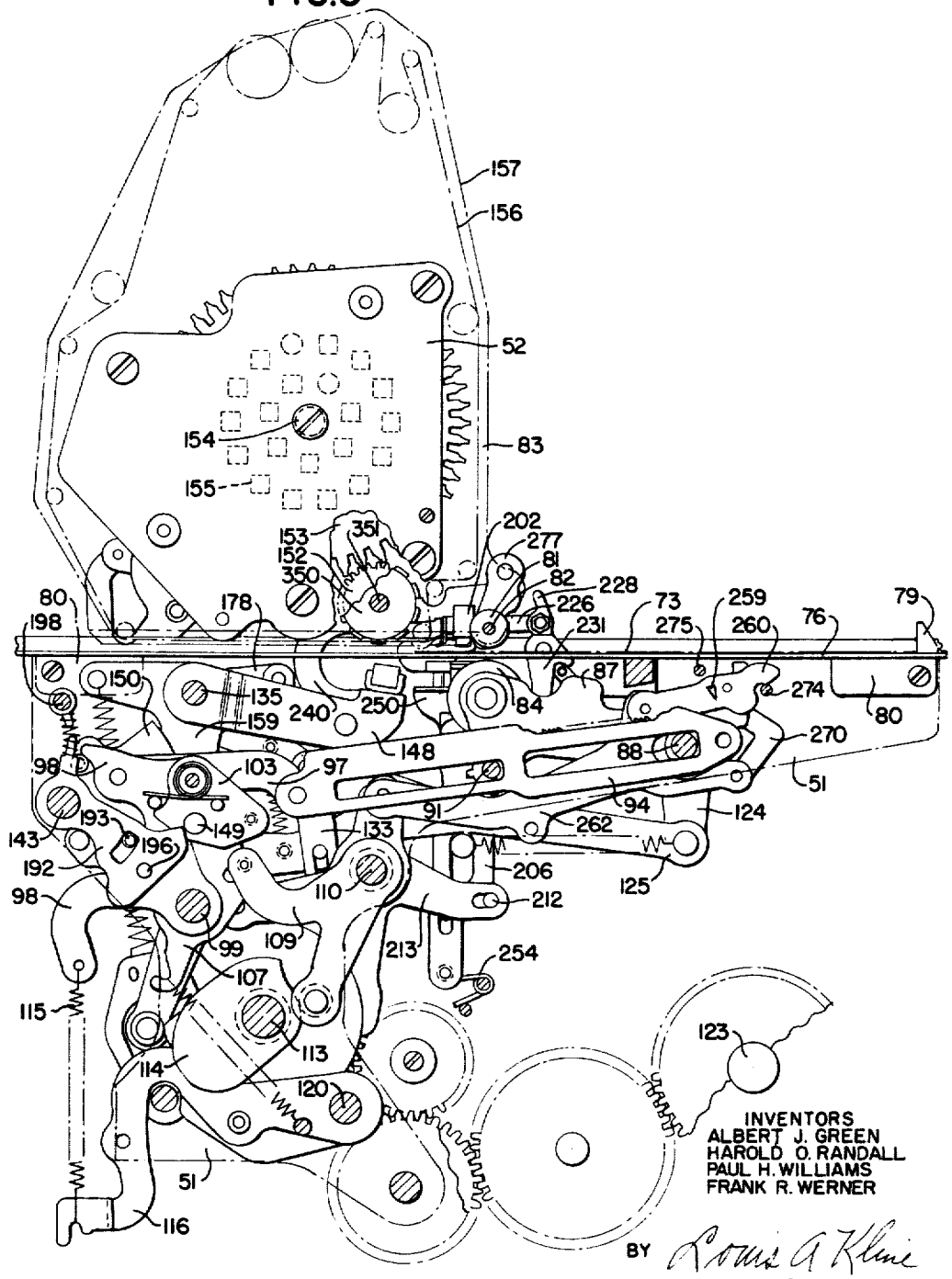

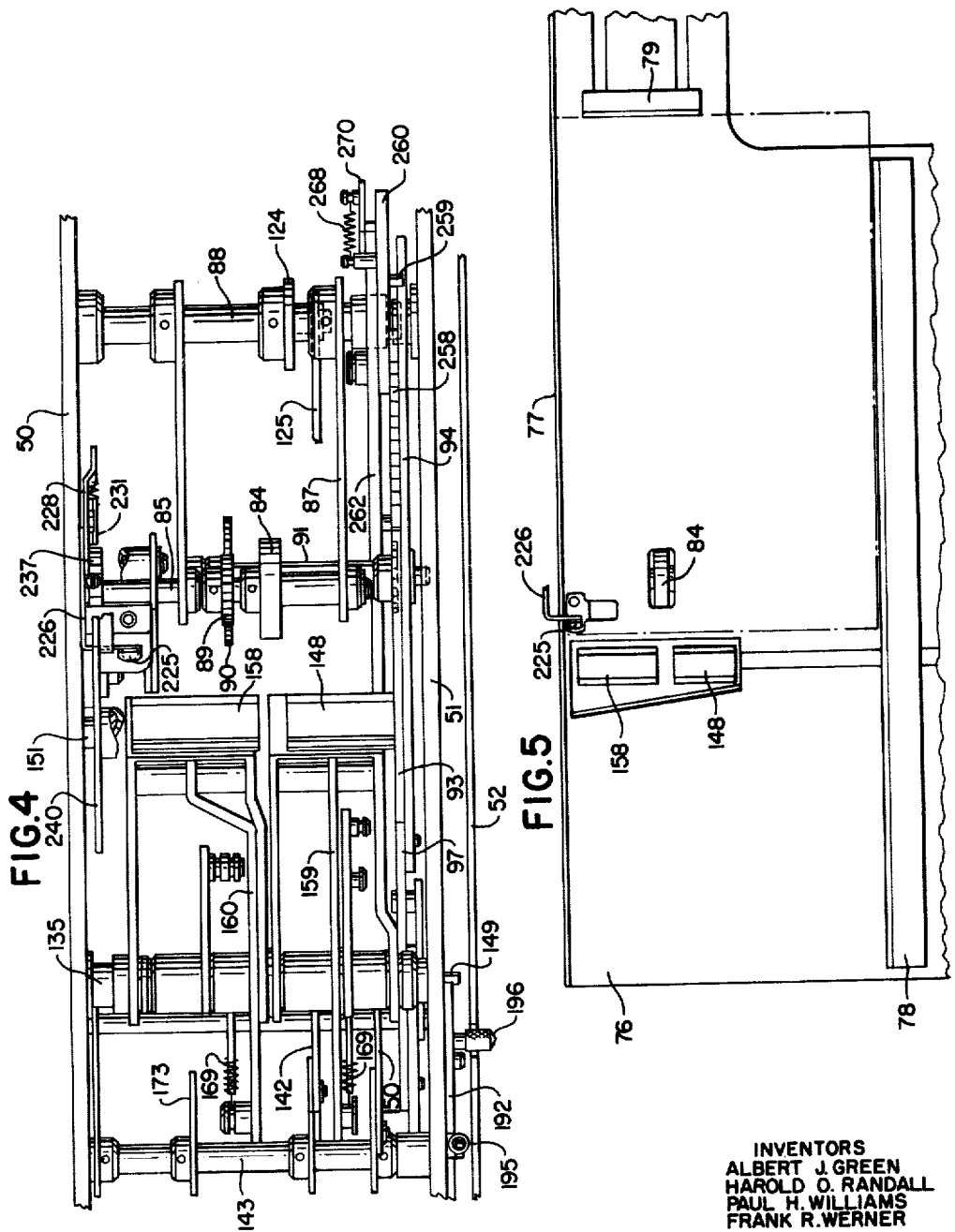

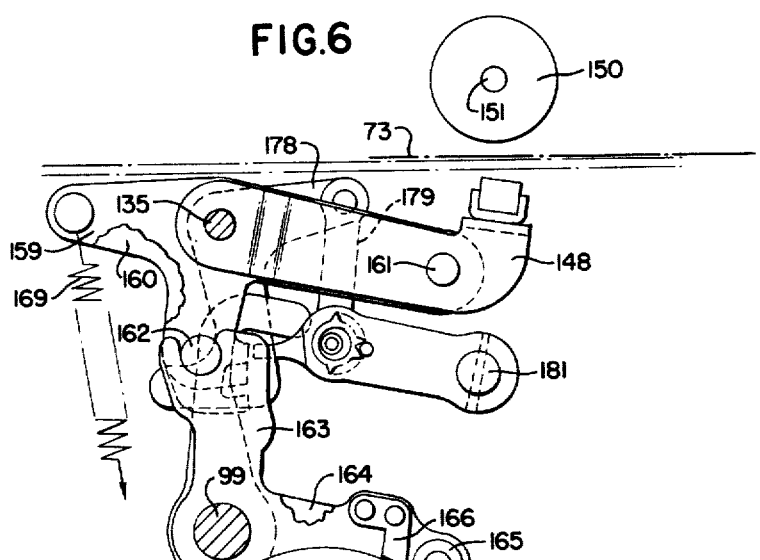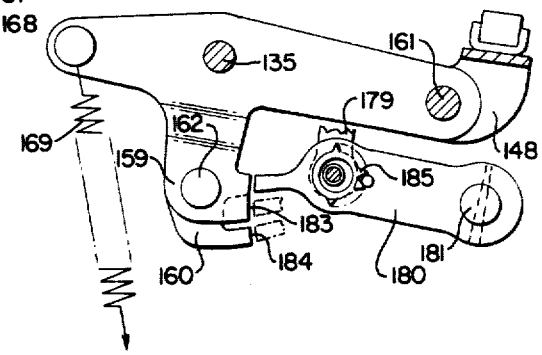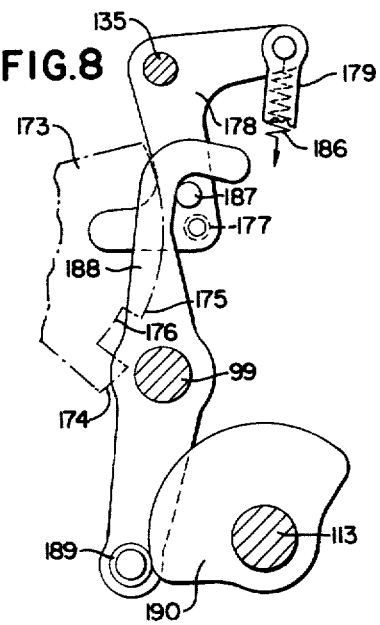

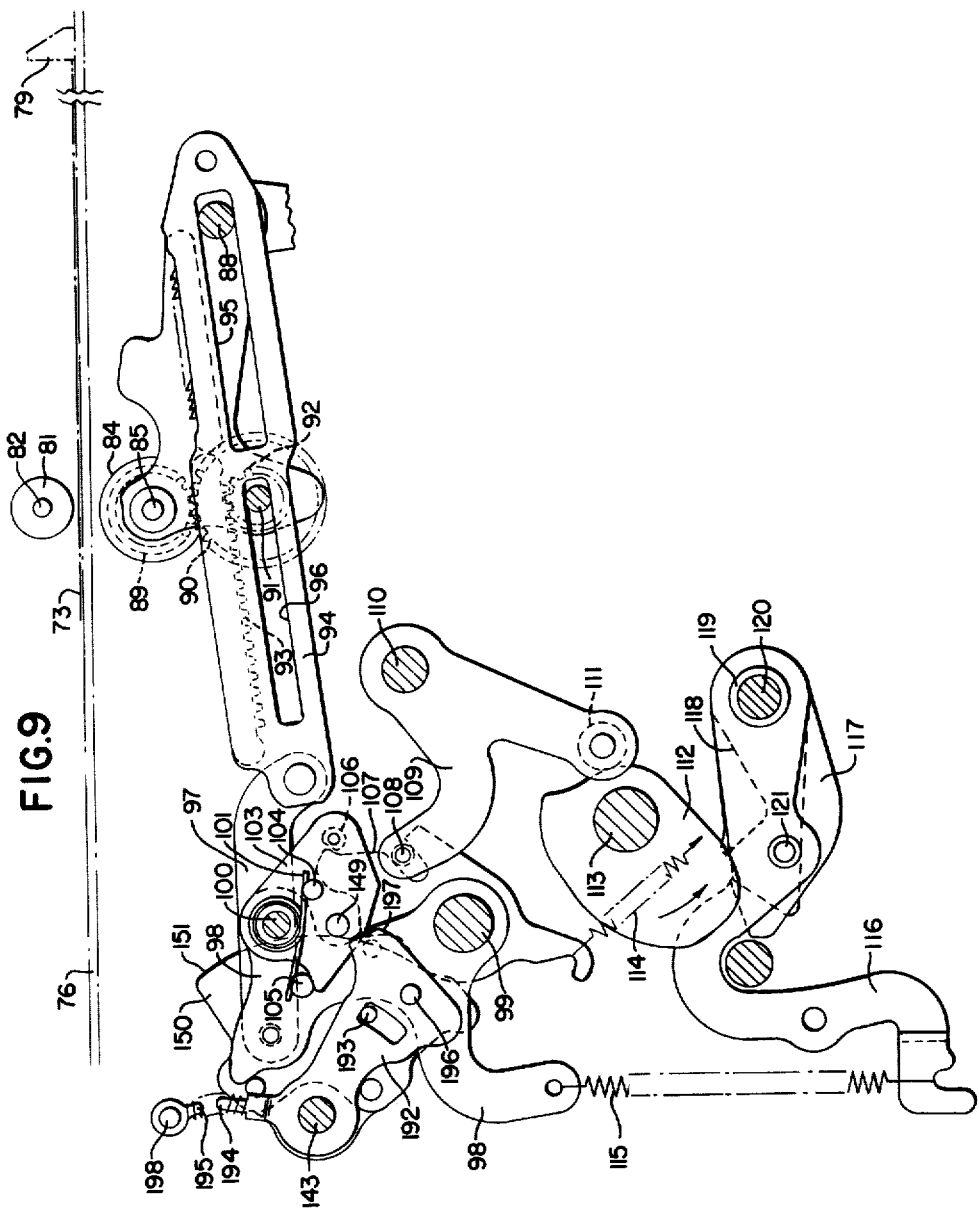

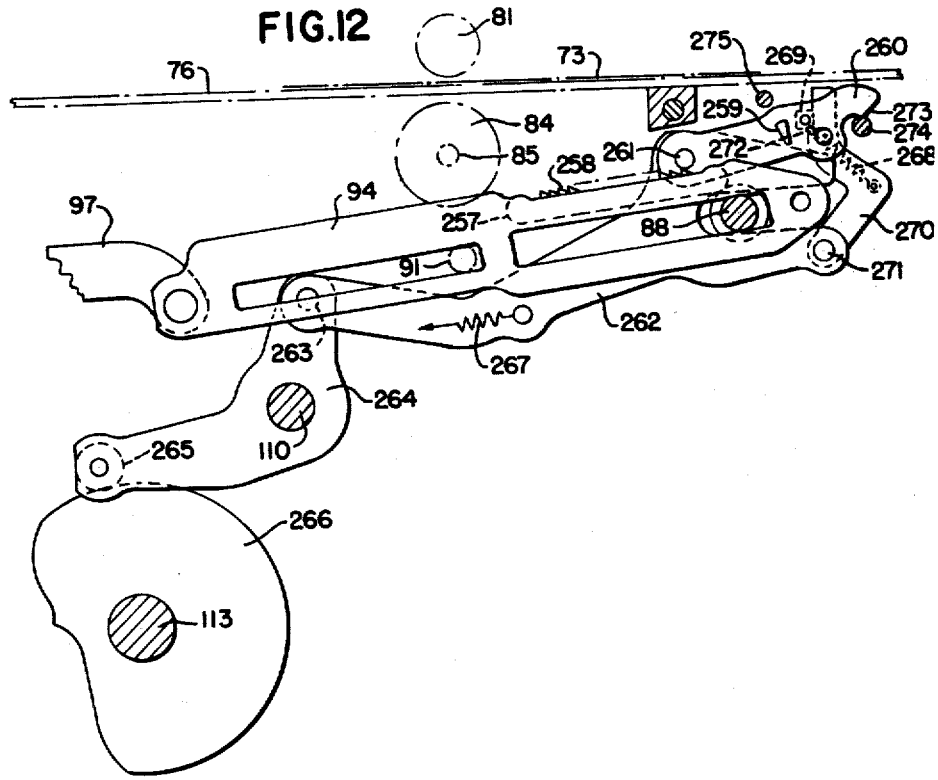

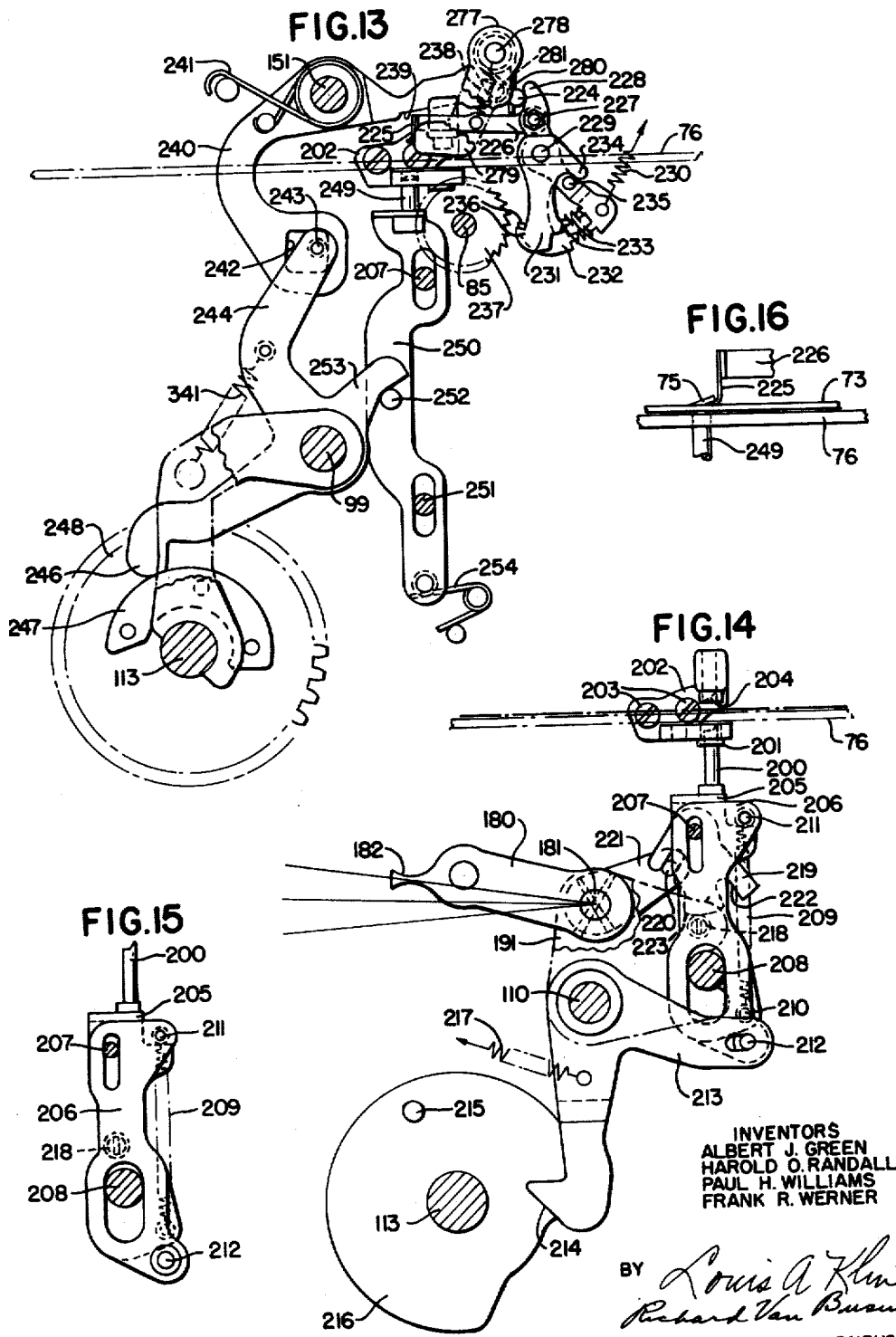

3,100,037
LINE FINDING MECHANISM FOR CASH REGISTERS AND ACCOUNTING MACHINES
Albert J. Green, Harold O. Randall, Paul H. Williams, and Frank R. Werner, Dayton, Ohio, assignors to The National Cash Register Company, Dayton, Ohio, a corporation of Maryland
Filed Sept. 1, 1961, Ser. No. 135,532
7 Claims. (Cl. 197—127)

This invention relates to cash registers and accounting machines and is particularly directed to the record-material-handling equipment of such machines.

Speaking in general terms, it is an object of this invention to provide improved record-material-feeding and -locating equipment for cash registers and similar accounting machines.

Another object is the provision of means to automatically position lined record material in relation to the record-printing mechanism so that records will be printed one after the other in consecutive order on the lines of said record material.

Another object is the provision of means to automatically position record material in relation to the printing means so that the next unprinted space on the record material will be located in printing position.

Still another object is to provide means operating in conjunction with the printing mechanism, when said printing mechanism is making an imprint on record material, to simultaneously form a protrusion on said record material corresponding to the next printing space or line thereon, and to further provide means coacting with the protrusion in the next machine operation to locate the next printing space on said record material in position to receive an imprint.

Another object is to provide a machine having plural printing means for printing records on record material with means associated with one of the printing means to make a protrusion on the record material simultaneously with the imprinting thereon and to further provide means coacting with the protrusion, upon feeding of the record material, to interrupt said feeding to locate the next or succeeding printing space or line on said record material in printing position.

Still another object is to provide means to simultaneously print a first record on the first line of pre-lined record material and to simultaneously punch a protrusion in said record material representing the second line thereon, during one cycle of machine operation, and to further provide means to engage or sense the protrusion during feeding movement of said record material, in the next cycle of machine operation, to interrupt said feeding movement to automatically locate said second line in printing position.

A further object of this invention is the provision of means to simultaneously print a record on record material and to form a corresponding protrusion or tab on said record material, and to further provide means coacting with the protrusion in the succeeding machine operation to locate said record material in position to receive the next imprint directly beneath the previous imprint.

With these and incidental objects in view, the invention includes certain novel features of construction and combinations of parts, a preferred form or embodiment of which is hereinafter described with reference to the drawings which accompany and form a part of this specification.

In the drawings:

FIG. 1 is a diagrammatic plan view of the keyboard of the machine embodying the present invention.

FIG. 2 is a facsimile of a guest check prepared on the machine of the present invention.

FIG. 3 is a side elevation, as observed from the left of the machine, showing in particular the check-printing and -feeding mechanism and the line-finding mechanism associated therewith.

FIG. 4 is a top plan view showing the side-spacing relationship of the various parts of the check-printing and -feeding mechanism and a portion of the line-finding mechanism.

FIG. 5 is a top plan view of the check table for presenting the check to the printing and feeding mechanisms.

FIG. 6 is a left side elevation of the printing hammers and their operating and selecting mechanisms.

FIG. 7 is a detail view of the printing hammers and a portion of their selecting mechanism.

FIG. 8 is a detail view of the mechanism for selectively controlling the operation of the printing hammers.

FIG. 9 is a left side elevation showing in particular the check-feeding mechanism and a portion of the controlling mechanism therefor.

FIG. 12 is a left side elevation of the mechanism for imparting a slight back-feeding movement to the check for the purpose of disengaging the line-finding mechanism.

FIG. 13 is a left side elevation showing in particular the line-finding mechanism and the manner in which it locates the next available printing portion of the check in relation to the printing mechanism.

FIG. 14 is a detail view of the mechanism for punching a line-finding protrusion or tab in the check, during operation of the printing mechanism.

FIG. 15 is a detail view of the punch for punching tabs in the check.

FIG. 16 is an enlarged fragmentary view of the tab-engaging hook and the tab-supporting plunger.

Figure 10:
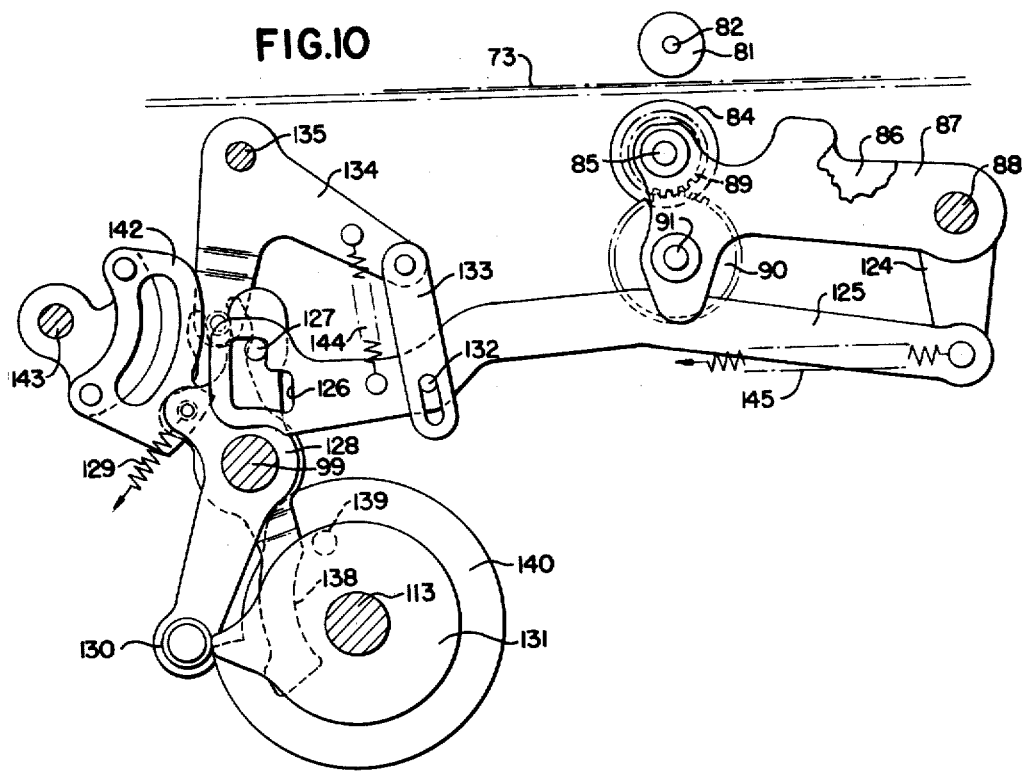
FIG. 10 is a left side elevation of the mechanism for selectively causing the check-feeding roller to press the check into yielding contact with the check pressure roller, for the purpose of feeding said check in relation to the printing mechanism.

The machine embodying the present invention is a well-known type of cash register of small overall dimensions and of economical construction yet having many of the appointments and features of larger and more costly machines. Many of the basic principles and main features of said machine are fully disclosed in United States Patents Nos. 2,880,930; 2,884,851; and 2,962,209, issued, respectively, April 7, 1959; May 5, 1959; and November 29, 1960, to Frank R. Werner et al., to which patents reference may be had for a complete description of the machine and its features, some of which are not pertinent to the present invention and for that reason will be described in a general way only herein.

Mechanism pertinent to an understanding of the present invention will be described in detail in the ensuing pages with reference to the various figures of the accompanying drawings, in which like reference numerals refer to like parts.

Machine in General and Framework

The mechanism of the machine is supported by and between right and left main frames, only the left frame 50 being shown here (FIG. 4), said frames being secured in spaced relationship to each other by a machine base (not shown), a back frame (not shown), and various cross frames, rods, and shafts. The base of the machine rests in and is secured to an oil drip pan (not shown), which is in turn secured to the top surface of a machine drawer cabinet (not shown), containing one or more cash drawers for use by the different operators of the machine. The slip- or check-printing mechanism is supported between the left frame 50 and a printer support plate 51 (FIG. 4), said printer support plate 51 being secured in fixed spaced relationship to said left frame 50 by means of studs, bars, and shafts. The mechanism of the machine is enclosed in a suitable case or cabinet 52 (FIG. 4), which is secured at its lower edge to the upturned rim of the oil pan.

*Keyboard, Differential Mechanisms, and Totalizers*

The keyboard of the machine comprises a row 1 (FIG. 1) of control keys 53 to 57 inclusive, a row 2 of control keys 58 to 62 inclusive, four denominational rows of amount keys 63, and a release lever 64, for releasing any depressed amount key 63 prior to machine operation. The depressed amount keys are automatically released near the end of each machine operation. The keyboard also includes a total control lever 65, often referred to as a "unit lock lever," which is movable to various positions for controlling the different functions of the machine, said positions being Register, Locked Register, Read Row 1, Reset Row 1, Read Row 2, and Reset Row 2. The total control lever 65 is provided with a lock 66, having two keys (not shown), one of which is a general-purpose key used by the operator and which permits said lever 65 to be moved to Register, Locked Register, Read Row 1, and Read Row 2 positions, said key also being used to lock said lever 65 in Locked Register position. The other key provided for the lock 66 is termed the "proprietor's key" and permits the total control lever 65 to be moved to Reset Row 1 and Reset Row 2 positions, in addition to the other positions, for the purpose of resetting the totalizers of the machine. Like the operator's key, the proprietor's key may be used to lock the lever 65 in Locked Register position, in which the machine is locked against operation.

Under ordinary conditions, the machine prepares a check similar to that shown in FIG. 2; however, when no check is inserted into the machine, a check feeler or sensing mechanism (not shown) activates the receipt-printing mechanism to cause a receipt to be issued having thereon the identical data which is ordinarily printed upon the check. Under certain conditions, it may be desirable to have both a check and a receipt issued by the machine, having thereon identical data, and this is controlled by a Receipt Key 67 (FIG. 1), located in the upper right-hand corner of the keyboard, depression of which key 67 causes a receipt to be issued, regardless of whether a check is inserted into the machine or not. The Receipt Key 67 is arranged to be released automatically at the end of a complete transaction; however, a lock slide 68 is provided for locking said Receipt Key 67 in depressed condition against automatic release, thus rendering the receipt-printing and -issuing mechanism effective at all times.

The control keys, the amount keys, the Receipt Key, the key release lever 64, and the lock slide 68 extend through corresponding openings in a keyboard top plate 70, secured to the machine framework, and the total control lever 65 is accessible through a corresponding opening in said plate 70.

Each denominational row of amount keys 63 (FIG. 1) has associated therewith a differential mechanism, not shown herein but fully disclosed in the patents referred to before, said differential mechanisms being positionable under control of said amount keys to in turn position corresponding type wheels and indicators and to transmit the values set up on said amount keys to the wheels of the selected totalizers during machine operation. Likewise, each row of control keys has associated therewith a differential mechanism, similar to the amount differential mechanisms, for positioning corresponding type wheels and indicators.

The machine in its present form is arranged to perform multiple-item transactions, comprising one or more item-entering operations and a final item total operation.

The keys 58 to 62 inclusive (FIG. 1) control the item-entering operations, and the keys 53, 54, and 55 control the item total operations, all of said keys being what are termed "motorized keys," in that depression of any one of said keys initiates machine operation. The control keys 56 and 57, in row 1, are also motorized, and depression of either of these keys initiates machine operation.

The present machine is provided with two lines of interspersed totalizers (not shown), the #1 line having three sets of totalizers thereon corresponding to the row 1 control keys 53, 54, and 55, and selected by depression of said keys to receive values corresponding thereto. The row 2 control keys 58 to 62 inclusive control the selection of corresponding totalizers on the #2 line to receive the values of the various items represented by said keys. Depression of the keys 58 to 62, inclusive, causes the corresponding set of totalizer wheels to be aligned with the amount actuators to receive values set up on the depressed amount keys 63. In addition to the three totalizers for the row 1 control keys 53, 54, and 55, the #1 totalizer line has thereon an item totalizer, which is selected for addition by the item keys 58 to 62 to accumulate a total of the value of the items set up on the amount keys 63, during the item-entering operations of a multiple-item transaction. The final item total operation of a multiple-item transaction is controlled by the keys 53, 54, and 55, depression of which causes the item totalizer to be cleared to print the total amount of the various items upon the record material. Use of the item total control keys 53, 54, and 55 clears the item totalizer; however, if it is desired to read the total of the items, the sub-total key 57 may be used to initiate an item sub-total operation, during which the total amount of the items is printed upon the record material and displayed by the indicators without being cleared from the item totalizer. The Tax key 56 in row 1 is used similarly to the keys 58 to 62 in row 2, for causing the amount of the tax set up on the amount keys 63 to be added into the item totalizer and simultaneously printed upon the record material. There is no corresponding set of totalizer wheels on the #2 totalizer line for the Tax key 56.

At present, the machine is arranged for use by a combination restaurant and bar, which, in addition to serving food, serves beer and other alcoholic beverages to its guests, and also dispenses miscellaneous items, such as, for example, cigarettes, cigars, and chewing gum, to its patrons.

While the above is a typical example of the use of the machine of this invention, it is not the intention to limit said machine to any particular system or to any particular business, as its versatility and flexibility make it readily adaptable to various other systems used in various other businesses.

FIG. 2 is a facsimile of a typical guest check 73 used by a combination restaurant and bar, and said check, at its upper end, carries the usual data, including the date, the identifying number of the server or waiter, the number of persons served, and the number of the check. The check also carries, at its lower end, a removable stub 74, bearing identical data to that provided at the top of the check, which stub may be removed from the main portion of the check and retained as a receipt or record of the transaction.

The check 73 in its present form has eleven lines for the entering of various items and their totals; however, this is a matter of choice, and the check may be arranged for more or fewer lines, depending upon the use to which it is being applied.

It will be noted that the various items are entered in the left-hand portion of the check, which is separated from the right-hand portion by a vertical line, and the totals are entered in the right-hand column of said check. Each time an item is entered in the left-hand column of the check, through the operation of the printing mechanism, a locating tab 75 is punched in the right-hand edge of said check for use in automatically finding the next available line, so that the next item will be printed thereon.

Check-Feeding Mechanism

In the present machine, all transactions are essentially what are termed "multiple-item transactions," comprising one or more item-entering operations and a final item total operation, and each guest check 73 (FIG. 2) may contain the entries involved in several such transactions. Prior to the first item-entering operation, the check 73 (FIG. 2) is placed upon the top surface of the check table between lateral guide rails, and the downward edge of said check is moved outwardly into engagement with a fixed stop on said table. Upon release of the machine for an item-entering operation, the check 73 is first fed inwardly full distance by the check-feeding mechanism, as will be explained presently, and is then return-fed outwardly the proper distance to locate the first line thereon in alignment with the printing mechanism. During this first item-entering operation, the amount of the first item is printed on the first line in the left-hand column, and simultaneously a first tab 75, corresponding to said line 1, is punched in the right-hand edge of the check some distance below said first item. The check-feeding mechanism retains the check against removal from the machine until after an item total operation is performed. During a second item-entering operation, the check 73 is again fed inwardly and then outwardly to engage the first tab 75 with the line-finding mechanism, which interrupts further outward feeding movement of said check and locates the second line thereon in proper relationship with the printing mechanism, so that the second item will be recorded on said second line. During this second item-entering operation, another tab 75 is punched in the right-hand edge of the check 73 to provide means for automatically locating the third printing line on said check in alignment with the printing mechanism in the third item-entering operation, and so on.

The mechanism for feeding the guest check 73 inwardly and outwardly is similar in every respect to that shown in the Werner et al. United States Patent No. 2,884,851, and for that reason only the portion of said mechanism pertinent to the present invention will be described in detail herein. However, the automatic line-finding mechanism, including the mechanism for punching the tabs 75 in the guest check 73 (FIG. 2), and the mechanism which coacts with said tabs to locate said guest check in relation to the printing mechanism, will be fully disclosed hereinafter, as it is believed to contain novel subject matter which constitutes an advancement in the art which is entitled to patent protection.

As explained in general above, the check 73 (FIGS. 2, 3, 5, and 9) is presented to the printing mechanism by being placed on the top surface of a check table 76 between a turned-up inward guide edge 77 and an outer guide bar 78, adjustably mounted on the top surface of the table 76 by means of screw studs therein in cooperation with slots in said table 76. The table 76 is secured in place by means of ears projecting downwardly therefrom in cooperation with screws threaded into the printer support plate 51 (FIG. 3). The adjustable bar 78 (FIG. 5) makes it possible to accommodate checks which may, under certain conditions, vary somewhat in width. The first line on the check 73 (FIGS. 3 and 5) is located in proper printing relationship with the printing mechanism by moving the lower end of said check into engagement with a stop 79 mounted on the top surface of the check table 76 and adjustable longitudinally for accurately locating the first line on said check with the printing mechanism.

In properly placing the check 73 on the table 76, the upper end of the check is inserted between a pressure roller 81 (FIG. 3) mounted on a stud 82 secured in a bar (not shown), carried by a ribbon framework 83, and a check-feeding roller 84, which is in alignment with the pressure roller 81 and arranged to move the check 73 into yielding engagement with said roller for the purpose of feeding the check.

The feed roller 84 (FIGS. 4, 9, and 10) is fast on a shaft 85 journaled in similar arms 86 and 87 in turn secured in fixed relationship to each other on a shaft 88 journaled in the left frame 50 and the printer support plate 51. Also secured on the shaft 85 is a pinion 89, which meshes with a gear 90 secured on a shaft 91 journaled in downward extensions of the arms 86 and 87. Also secured on the shaft 91 (FIGS. 4 and 9) is a pinion 92, which meshes with teeth in a short rack 93 secured to the inner face of a slide 94 mounted for shifting movement by means of slots 95 and 96 therein in cooperation, respectively, with the shafts 88 and 91. A link 97 (FIG. 9) pivotally connects the slide 94 to an arm 98 free on a rod 99 supported by the left frame 50 and the printer support plate 51 (FIG. 4). The arm 98 carries a stud 100, which pivotally supports an operating arm 103 urged clockwise by a torsion spring 101, one leg of which engages a stud 104 in said arm 103 and the other leg of which engages a stud 105 in the arm 98, to normally maintain a rearward stop surface, formed on said arm 103, in yielding engagement with said stud 105, as shown here. The arm 103 carries a stud 106, having thereon a flat surface which coacts with an upward extension of a lever 107 free on the rod 99 and having a slot engaged by a stud 108 in one arm of a bell crank 109 free on a stud 110 supported by the frame 50 and the plate 51. A downward leg of the bell crank 109 carries a roller 111, which coacts with the periphery of a plate cam 112 secured on a printer cam shaft 113 journaled in the frame 50 and the plate 51. A spring 114, one end of which is connected to a hook formed by a downward extension of the lever 107, urges said lever counter-clockwise to in turn urge the bell crank 109 clockwise to normally maintain the roller 111 in yielding engagement with the periphery of the cam 112. A spring 115 (FIG. 9) is tensioned between a downward extension of the arm 98 and a rearward extension of a tension lever 116 connected in fixed relationship by a hub 119 to companion cranks 117 and 118, said hub 119 being free on a stud 120 extending between the frame 50 and the plate 51. The lever 116 carries a roller 121, which coacts with the periphery of the cam 112, and the cranks 117 and 118 in turn coact with other cams and rollers (not shown), said cams being mounted on the cam shaft 113, to operate said cranks and the lever 116 to maintain the spring 115 properly tensioned to impart the proper rearward return movement to the slide 94 (FIG. 9) without causing said slide to slam unnecessarily during long return feeding movements.

Prior to operation of the check-feeding mechanism, it is necessary to bring the feed roller 84 (FIG. 10) into yielding engagement with the check 73 and the pressure roller 81, so that feeding movement will be imparted to said check.

Referring to FIGS. 3, 4, and 10, secured on the shaft 88 is a crank 124, having pivotally connected thereto the forward end of a pitman 125 having in its rear end an L-shaped slot 126, through which extends a stud 127 fast in the upper end of a lever 128 free on the rod 99. A spring 129 urges the lever 128 counter-clockwise to normally maintain a roller 130, secured on its downward end, in yielding engagement with the periphery of a plate cam 131 secured on the cam shaft 113.

Figure 11:
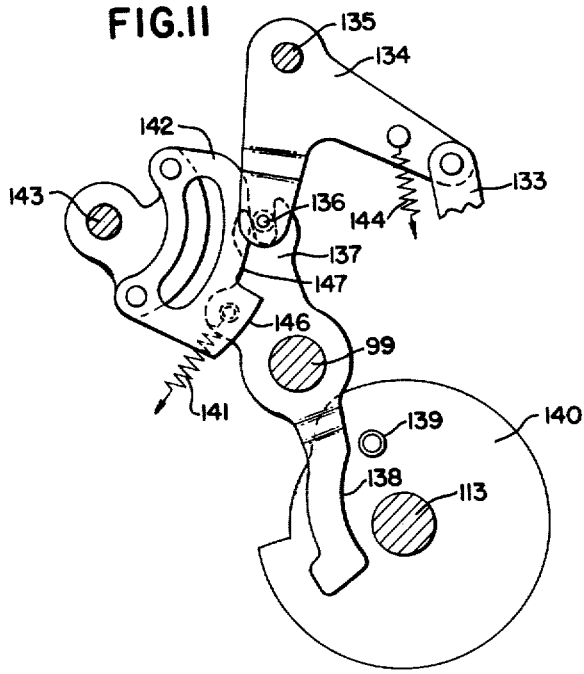
FIG. 11 is a detail view of a portion of the mechanism for selectively controlling the operation of the mechanism shown in FIG. 10.

The engaging and disengaging movement of the pitman 125 is controlled by the stud 127 (FIG. 10) in the lever 128 in cooperation with the L-shaped slot 126 in said pitman. The pitman 125 carries a stud 132, which engages a slot in the downward end of a link 133, the upper end of which is pivotally connected to one arm of a bell crank 134 rotatably supported on a rod 135 in turn supported between the frame 50 and the plate 51 (FIG. 4). The bell crank 134 (FIGS. 10 and 11) carries a stud 136 engaged by a slot in the upper end of a lever 137 free on the rod 99 and having, on its downward end, an arcuate cam surface 138, which cooperates with a roller 139 mounted on the outer face of a plate cam 140 in turn secured on the cam shaft 113. A spring 141 (FIG. 11) urges the lever 137 counter-clockwise to normally maintain the stud 136 in the bell crank 134 in yielding engagement with the periphery of a selecting cam 142 secured on a selecting cam shaft 143 journaled in the frame 50 and the plate 51 (FIG. 4).

The positioning of the selecting shaft 143 and the cam 142 is controlled by the row 1 control keys 53 to 57 inclusive and by the row 2 control keys (FIG. 1) in the manner fully disclosed in the Werner et al. Patent No. 2,884,851. A spring 144, tensioned between the bell crank 134 and the pitman 125 (FIG. 10), urges said pitman upwardly to normally maintain the stud 132 in yielding engagement with the upper end of the slot in the link 133. A spring 145 urges the pitman 125 rearwardly, or to the left (FIG. 10), to normally maintain the right-hand edge of the vertical branch of the slot 126 in yielding engagement with the stud 127, as shown here.

The printer cam shaft 113 is connected to a main cam shaft 123 (FIG. 3) by the gearing shown here, and it and said shaft and the cams 131 and 140 (FIGS. 10 and 11) are driven in unison with said shaft 123 one counter-clockwise revolution each machine operation. Immediately at the beginning of rotation of the shaft 113, the node of the cam 131 moves out of engagement with the roller 130 to free the lever 128 to the action of the spring 129, which rocks said lever counter-clockwise. This permits the pitman 125 to move rearwardly, under influence of the spring 145, to engage the feeding roller 84 with the check 73 and carry said check into yielding engagement with the pressure roller 81. Initial movement of the cam 140 causes the roller 139 (FIG. 11) to engage the arcuate camming surface 138 and rock the lever 137 clockwise, to in turn rock the bell crank 134 counter-clockwise, which, through the link 133, lifts the pitman 125 (FIG. 10). This moves the clearance or horizontal branch of the slot 126 into the path of the stud 127, so that restoring movement clockwise of the lever 128 by the cam 131, near the end of machine operation, will cause the stud 127 to move idly in the clearance portion of said slot 126 and thus permit the pitman 125 to remain in its rearward position and the feed roller 84 to remain in yielding engagement with the check 73 and the pressure roller 81. While the lever 137 (FIG. 11) and the bell crank 134 are in their extreme clockwise and counter-clockwise positions, the selecting cam shaft 143 and the selecting cam 142 are positioned. When no control key is depressed in row 1 (FIG. 1), as in item-entering operations, under control of the keys 58 and 61 in control row 2, the cam 142 is so positioned that a high portion 146 thereof is in the path of the stud 136, and, as a result, the bell crank 134 is retained in its moved position to in turn retain the pitman 125 in its raised position, in which the clearance or horizontal branch of the slot 216 is in alignment with the stud 127. As a result of this, return movement of the lever 128 and the stud 127, near the end of machine operation, causes said stud 127 to move idly in the clearance portion of the slot 126 without restoring the pitman, thus permitting the feed roller 84 to retain the check 73 in yielding contact with the pressure roller 81, so that said check may not be removed from the machine at the end of an item-entering operation.

Item total operations are initiated by use of one of the row 1 control keys 53, 54, or 55, which causes the selecting cam 142 (FIG. 1) to be so positioned that a low portion 147 of its periphery is opposite the stud 136. This permits the pitman 125 to shift forwardly, near the end of machine operation, when the node of the cam 131 again engages the roller 130, to rock the arms 86 and 87 counter-clockwise to disengage the feed roller 84 from the pressure roller 81 and the check 73 to permit removal of said check from the machine at the end of item total operations. The row 1 keys 46 and 57 (FIG. 1), which are not associated with item total operations, cause the cam 142 to be so positioned that its high portion 146 is opposite the stud 136. This positions the pitman 125 in its upper position, where the horizontal branch of the slot 126 is opposite the stud 127, so that in this case the feed roller 84 will remain in engagement with the check 73 and the pressure roller 81 to prevent removal of said check from the machine.

Secured on the selecting shaft 143 (FIG. 9) is a selecting cam 150, the periphery of which coacts with a stud 149 in the arm 103 to determine whether or not the stud 106 is to be retained in the path of the upward extension of the lever 107, to render the check-feeding mechanism operative or inoperative, depending upon which control key is depressed in rows 1 and 2 (FIG. 1).

Item-entering operations are controlled by the keys 58 to 62 in row 2, and in such operations no key is depressed in row 1. In this case, the selecting cam 150 is positioned as shown in FIG. 9, in which a low portion 151 of its periphery is opposite the stud 149 to retain the stud 106 in the path of the upper extension of the lever 107, so that clockwise operation of said lever, upon initial movement of the cam 112, will rock said arm 103 and the arm 98 clockwise to shift the slide 94 forwardly, or toward the right (FIG. 9). This, through the gearing shown here and explained above, rotates the feed roller 84 counter-clockwise to feed the check 73 from its position against the stop 79 inwardly, or towards the left (FIG. 9), its full extent of movement. Continued rotation of the cam 112, prior to operation of the printing mechanism, restores the lever 107 counter-clockwise, through the action of the spring 114, to permit the spring 115 in turn to restore the arms 98 and 103 also counter-clockwise to shift the slide 94 rearwardly. This rotates the feed roller 84 clockwise to feed the check 73 forwardly to align the first line thereon (FIG. 2) with the printing mechanism in preparation for the first impression.

After the first line on the check 73 (FIG. 2) has been brought into printing position, as explained above, operation of an item printing hammer 148 (FIGS. 3 and 6), as will be explained later, causes a resilient platen, carried by said hammer, to carry said check and an overlying inking ribbon 156, carried by an inking ribbon framework 157 attached to the left frame 50, into sharp impact with type wheels 350 to print the data set up on the amount keys 63 and the item control keys 58 to 61 inclusive on the first line of the left-hand column of said check 73. Located inwardly from the item hammer 148 (FIG. 4) and immediately adjacent thereto is an item total hammer 158, which coacts with a corresponding set of type wheels 350, similar to the item type wheels, for printing item totals in the right-hand column of the check 73, as will be explained presently. The type wheels 350 are rotatably supported on a shaft 351 (FIG. 3) extending between a printer support plate 352 and the left frame 50, said plate 352 being connected to said frame 50 by various studs, bars, and shafts. Each of the type wheels 350 carries a gear 152 engaged by the teeth of a corresponding transmission gear 153 rotatably mounted on a shaft 154 supported by the plate 352 and the left frame 50, by means of internal teeth therein, which bear on the periphery of a disc (not shown) supported by said shaft 154. Each of the transmission gears 153 is connected, by corresponding pinions (not shown) and a square transmission shaft 155 supported by the machine framework, to corresponding transmission gears (not shown), which are in turn connected to and operated by the corresponding differential mechanisms for the amount keys 63 and the control keys in rows 1 and 2.

Referring to FIGS. 3, 4, and 6, the hammers 148 and 158 are yoked members, the parallel arms of which are rotatably supported on the rod 135. Associated respectively with each hammer 148 and 158 is an operating lever 159 and 160 of similar outline, rotatably supported on the rod 135 and each having in its forward end a hole which engages a stud 161, extending between the parallel arms of the corresponding hammer. Downward extensions of the levers 159 and 160 carry, respectively, studs 162, which engage slots formed in outward extensions of cam levers 163 and 164, free on the rod 99. Each lever 163 and 164 carries a roller 165 and an impression block 166, which coact with the peripheries of corresponding plate cams 167 and 168 secured on the cam shaft 113 and making one counter-clockwise revolution each machine operation. Springs 169 urge the levers 159 and 160 counter-clockwise to in turn urge the companion levers 163 and 164 clockwise to maintain the rollers 165 and the blocks 166 in yielding engagement with the peripheries of the corresponding cams 167 and 168. It will be noted that normally the roller 165 retains the corresponding block 166 slightly above the periphery of the corresponding cam 167 and 168 to reduce frictional drag and thus ease the operation of the cam shaft 113. During counter-clockwise rotation of the cams 167 and 168, an abrupt shoulder 170, formed on said cams, rides off of the corresponding roller 165, whereupon downward faces of the blocks 166 engage the periphery of said cams until the shoulders pass beyond the edges of said blocks, whereupon the springs 169 impart a sharp striking movement to the corresponding hammers 148 and 158 to cause them to in turn carry the check 73 and the inking ribbon 156 (FIG. 3) into engagement with the type wheels 350 to print a record on the face of said check 73.

The slide-operating arm 103 (FIG. 9), in addition to being controlled by the selecting cam 150, may also be rendered operative or inoperative by a hand-operated lever 192, rotatably supported on the shaft 143 and limited in its movement in either direction by a slot therein in cooperation with a stud 193 secured in the plate 51. A tang 194, formed on an upward extension of the lever 192, supports the lower end of a compressible spring 195, the upper end of which is connected to a spring eye, which in turn is pivoted on a stud 198 secured in the frame 50. A finger stud 196, carried by the lever 192, extends through a suitable clearance opening in the machine cabinet and provides means for manually moving the lever 192 to either of its positions, in which it is retained by the action of the spring 195, which acts as an "over-center device" to yieldingly urge and retain the lever 192 in either of its positions, as determined by the slot therein in cooperation with the stud 193. Moving the lever 192 from its ineffective position, as shown in FIG. 9, counter-clockwise to its effective position causes a cam surface 197 on a forward projection thereof to engage the stud 149 and rock the arm 103 counter-clockwise to move the stud 106 out of the path of the upward extension of the lever 107, so that no feeding movement will be imparted to the slide 94, and consequently in this case the check 73 will not be fed.

*Printing Hammer Control Mechanism*

Mechanism controlled by the row 1 control keys 53 to 57 (FIG. 1) is provided for selectively controlling the operation of the hammers 148 and 158 in item-entering and item total operations. This mechanism comprises a selecting cam 173 (FIGS. 6, 7, and 8) secured on the shaft 143 and having on its periphery high, intermediate, and low control surfaces 174, 175, and 176, which are positioned in relation to a stud 177 in a bell crank 178 free on the rod 135, under control of the row 1 control keys. The bell crank 178 is pivotally connected by a link 179 to a selecting arm 180 (FIG. 6) secured on a short shaft 181 journaled between the left frame 50 and a bracket 191 (FIG. 14) supported between said frame 50 and the plate 51 by the stud 110 and a stud 208 in said frame 50. The arm 180 (FIGS. 6 and 7) has a rearwardly-extending finger 182, which coacts with control surfaces 183 and 184 on the levers 159 and 160 for the hammers 148 and 158. The arm 180 (FIG. 7) carries an eccentric 185, which rotatably supports the lower end of the link 179 for accurately adjusting the finger 182 in relation to the control surfaces 184 and 183. A spring 186 (FIG. 8) urges the bell crank 178 clockwise to normally maintain a stud 187, carried thereby, in yielding engagement with an inside surface formed on the hook-shaped upper end of a lever 188, free on the rod 99. The spring 186 also urges the lever 188 counter-clockwise to maintain a roller 189, mounted on the lower end thereof, in yielding engagement with the periphery of a plate cam 190, secured on the printer cam shaft 113.

Counter-clockwise rotation of the shaft 113 and the cam 190 permits the stud 177 and the bell crank 178, under influence of the spring 186, to sense the control surface on the cam 173 to position the arm 180 and the finger 182 in proper relation to the control surfaces 183 and 184 on the levers 159 and 160. The item total keys 53, 54, and 55 (FIG. 1) position the cam 173 so that the intermediate surface 175 is in engaging relationship with the stud 177, which permits the bell crank 178 and the link 179 to position the arm 180 and the finger 182 in their intermediate, or No. 2, position, as shown in dot-and-dash lines in FIG. 7, to obstruct printing movement of the item hammer 148 and to permit printing movement of the item total hammer 158. Depression of the Tax key (FIG. 1) causes the cam 173 to be so positioned that the low surface 176 on the periphery thereof is opposite the stud 177 (FIG. 8) to cause the finger 182 to be positioned in its lowermost, or No. 3, position, as shown in dot-and-dash lines in FIG. 7, in which printing movement of the total hammer 158 is obstructed and the item hammer 148 is free for printing movement. Depression of the Sub-Total key 57 causes the cam 173 to be so positioned that the high surface 174 thereon is opposite the stud 177 to position the finger 182 in its uppermost, or No. 1, position, as shown in full lines in FIG. 7, in which the printing movement of both hammers 148 and 158 is obstructed. When any one of the item keys 58 to 62 in row 2 is used to initiate machine operation and, consequently, no key is depressed in row 1, the selecting cam 173 (FIG. 8) is positioned automatically, so that the lowest control surface 176 thereon is opposite the stud 177 to cause the finger 182 to be positioned in its lowermost, or No. 3, position, to obstruct printing movement of the item total hammer 158 and to permit printing movement of the item hammer 148.

*Tab-Punching Mechanism*

Simultaneously with the printing of each item on the lines in the left-hand column of the guest check 73 (FIG. 2), a corresponding line-finding tab 75 is punched in the right-hand edge of said check, which tab, in coaction with the automatic line-finding mechanism, presently to be described, locates the next, or following, line in proper printing relationship with the type wheels and the printing hammers. The selecting mechanism which controls the selection of the hammers 148 and 158 (FIGS. 6, 7, and 8), including the selecting cam 173 and the selecting arm 180, also controls the operation of the mechanism that forms the tabs 75 in the right-hand edge of the check 73. In item-entering operations, initiated by the keys 58 to 62 inclusive in row 2, the selecting cam 173, as previously explained, is so positioned that its low portion 176 is opposite the stud 177 and positions the finger 182 and the arm 180 in their lowermost, or No. 3, position. In this instance, the finger 182 blocks the operation of the item total hammer 158 and frees the item hammer 148 for operation and simultaneously renders the punching mechanism effective to form the corresponding tab 75 in the right-hand edge of said check 73. It should also be remembered that the Tax key 56 in row 1 functions the same as an item-entering key to render the item hammer and the tab-punching mechanism effective in tax operations.

The tab 75 (FIGS. 2 and 16) is formed in the check 73 by the properly-shaped upper end of a punch 200 (FIGS. 14 and 15), which fits freely in a bushing 201 in a tab die block 202 secured by screws 203 to the outer face of the left frame 50 (see also FIG. 3). The punch 200 is arranged to slide upwardly in the bushing 201 from the position shown here and carries the check 73 upwardly into engagement with an anvil 204 secured in a hole in a vertical extension of the block 202, said hole being in alignment with the hole in said bushing 201 to form the tab 75. The punch 200 (FIG. 14) is secured in a bent-over portion formed on the upper end of a slide 205, which, together with a companion operating slide 206, is mounted for vertical shifting movement by means of matching slots therein in cooperation with studs 207 and 208 secured in the left frame 50. A spring 209, tensioned between a stud 210 in the slide 205 and a stud 211 in the slide 206, urges said slides in opposite directions to normally maintain the stud 211 in engagement with a shoulder formed on the punch slide 205, to form a yielding driving connection between said slides. At its lower end, the slide 206 (FIG. 14) carries a stud 212, which engages a slot in a forward arm of a lever 213 free on the stud 110, said lever having a hook-shaped downward extension with a cam surface 214, which coacts with a stud 215 in a plate cam 216 secured on the printed cam shaft 113. A spring 217 urges the lever 213 clockwise and the slides 205 and 206 downwardly to normally maintain the upper ends of the slots in said slide 205 in yielding engagement with the studs 207 and 208. The punch slide 205 (FIGS. 14 and 15) has secured therein a flattened stud 218, which coacts with the periphery of a punch-selecting plate 219 free on the stud 207. The plate 219 has a slot which engages a stud 220 and a crank 221 secured on the shaft 181, which, it will be recalled, by referring to FIGS. 7 and 8, is positioned under control of the hammer-selecting cam 173.

As previously explained, positioning of the hammer-selecting cam 173 (FIG. 8), under control of the keys 58 to 62 of row 2 and the Tax key 56 of row 1, causes the lowest portion 176 to be moved opposite the stud 177 to cause the bell crank 178 to position the arm 180 and the finger 182 (FIGS. 6, 7, and 14) in their lowermost, or No. 3, position to obstruct printing movement of the item total hammer 158 and to simultaneously permit printing movement of the item hammer 148. This positioning of the arm 180, the shaft 181, and the crank 221 (FIG. 14) causes said crank to rock the punch-selecting plate 219 clockwise to align a notched portion 222 of its periphery with the flattened portion of the stud 218 to permit upward movement of the slides 205 and 206, upon operation of the cam 216 and the stud 215, to cause the punch 200 to engage the check 73 and, in cooperation with the anvil 204, form a tab in its right-hand edge corresponding to the last item printed in the left-hand column of said check.

Positioning of the hammer-selecting cam 173 (FIG. 8) under control of the item total keys 53, 54, and 55 (FIG. 1) causes the arm 180 and the finger 182 to be positioned in their No. 2, or intermediate, position (FIG. 7), which, through the shaft 181 and the crank 221 (FIG. 14), positions the punch-selecting plate 219 so that a high portion 223 thereof is opposite the stud 218 to obstruct upward movement of the slide 205 and the punch 200, so that no line-finding tab 75 will be punched in the right-hand edge of the check 73 (FIG. 2) in item total operations. In this case, the spring 209 permits the slide 206 and the lever 213 to operate independently of the companion slide 205 under control of the stud 215. Likewise, positioning of the hammer-selecting cam 173 under control of the Sub-Total key 57 causes the finger 182 to be positioned in its No. 1, or uppermost, position, as shown in FIGS. 7 and 14, to cause the punch-selecting plate 219 to be positioned as shown here, where the surface 223 remains opposite the stud 218 to block upward movement of the slide 205 and the punch 200, so that no line-finding tab 75 will be formed in the check 73 in sub-total operations.

Automatic Line-Finding Mechanism

During forward, or outward, feeding of the check 73 (FIGS. 1, 13, and 16), an automatic line-finding hook 225 is arranged to sense for and be engaged by the last tab 75 formed on the right-hand edge of said check to align the next line on said check with the printing mechanism, so that a record of the operation will be printed thereon.

The hook 225 is secured to a bent-over portion of an arm 226 pivoted on an eccentrically-adjustable stud 227 in the upper end of a lever 228 free on a stud 229 secured in the left frame 50. A spring 230 urges the lever 228 counter-clockwise to normally maintain an upward extension thereof in yielding engagement with a stop stud 224 secured on the left frame 50. Also pivoted on the stud 229 (FIG. 13) are companion stop pawls 231 and 232, yieldingly connected to the lever 228 by compressible springs 233 compressed between corresponding tangs formed on said pawls and said lever to urge said parts in opposite directions to normally maintain depending fingers 234, formed on said pawls 231 and 232, in yielding engagement with a stop stud 235, carried by said lever 228. The pawls 231 and 232 have offset teeth 236, arranged to coact with teeth formed in the periphery of a ratchet 237, secured on the shaft 85, to which shaft the feed roll 84 and the pinion 89 are also secured.

A spring 238 (FIG. 13) urges the arm 226 clockwise to normally maintain the upper end of the hook 225 in yielding contact with a flat surface 239 formed on the thickened lower edge of a lever 240 free on the type wheel shaft 351 and urged clockwise by a torsion spring 241 to normally maintain the forward wall of a square slot 242, in a downward extension thereof, in yielding engagement with a stud 243, secured in an upward extension of a lever 244, free on the rod 99. A spring 341 (FIG. 13) urges the lever 244 counter-clockwise to normally maintain a downward extension 246 thereof in yielding contact with the periphery of an arcuate cam member 247 secured to the face of a gear 248 in turn secured to the printer cam shaft 113 and forming the connection between the train of gearing shown in FIG. 3 and said printer cam shaft 113.

After the check 73 (FIGS. 13, 14, and 16) has been fed initially inwardly full distance, and prior to operation of the punch 200, counter-clockwise rotation of the gear 248 and the arcuate cam member 247 moves said cam member beyond the extension 246 of the lever 244 to free said lever and its companion lever 240 to the action of the springs 241 and 341, which rock said lever 240 clockwise, causing the flat surface 239 to rock the hook 225 and the arm 226 counter-clockwise, or downwardly, against the action of the spring 238, to move said hook into the path of the last tab 75 punched in the right-hand edge of the check 73.

Simultaneously with the downward movement of the hook 225, a tab-supporting plunger 249 (FIGS. 13 and 16) is moved upwardly to engage the bottom surface of the check 73 and support the tab being engaged by the hook 225. The plunger 249 extends through a guide hole in the block 202 and is secured in a bent-over upper end of a slide 250, having vertical slots which engage the stud 207 and a stud 251 secured in the left frame 50. The slide is urged upwardly by a spring 254, which normally maintains a stud 252 therein in yielding engagement with a forward extension 253 of the lever 244.

Coincidentally with downward movement of the hook 225, counter-clockwise movement of the lever 244 withdraws the extension 253 from the stud 252 to permit the spring 254 to shift the slide 250 and the plunger 249 upwardly to press the check 73 into yielding engagement with the bottom surface of said hook 225 to insure that said hook properly engages the last tab 75 formed on said check 73. Immediately thereafter, the check 73 receives return movement forwardly, during which movement the last tab 75 formed in the right-hand edge thereof engages the hook 225 and carries said hook and the arm 226 forwardly in unison therewith. Forward movement of the arm 226 (FIG. 13) rocks the lever 228 clockwise, against the action of the spring 230, causing the springs 233 to move the pawls 231 and 232 into yielding engagement with the teeth of the ratchet 237, thereby interrupting forward feeding movement of said ratchet, the shaft 85, and the feed roller 84 (FIG. 9) to in turn interrupt outward feeding movement of said check 73 to locate the next line thereon in position to receive the next entry upon operation of the printing mechanism.

It will be noted that the two staggered teeth 236 on the pawls 231 and 232 permit a more accurate engagement with the teeth of the ratchet 237 in order to obtain a more precise alignment of the check 73 with the printing mechanism.

After the next line on the check 73 has been aligned with the printing mechanism, said mechanism functions to print an entry in the proper column and proper line of said check. In operations controlled by the item-entering keys 58 to 62 (FIG. 1) in row 2 and by the Tax key 56 in row 1, the punch mechanism shown in FIG. 14 and described above functions to form a tab 75 corresponding to each operation in the right-hand edge of the check to automatically locate the next line on said check in printing position.

Mechanism is provided for back-feeding the check 73 a slight distance immediately after printing has been effected, to disengage the tab 75 (FIGS. 13 and 16) from the hook 225, after which the cam member 247 engages the extension 246 to restore the lever 244 clockwise and to simultaneously restore the lever 240 counter-clockwise, to withdraw the surface 239 from the upper end of the hook 225 to permit the spring 238 to restore said lever and said hook clockwise to normal position, as shown here. Disengagement of the hook 225 from the tab 75 permits the spring 230 to immediately disengage the teeth 236 of the pawls 231 and 232 from the teeth of the ratchet 237 so as not to interfere with outward feeding movement of said ratchet and the feeding roller 84, to return the check to starting position after printing has been effected.

The mechanism for backfeeding the check 73 out of engagement with the line-finding hook 225 comprises a plate 257, secured on the slide 94 near its upper edge (FIG. 12), said plate having cut therein a series of ratchet teeth 258 arranged to coact with a wedge-shaped tooth 259 mounted on the outer face of an arm 260 pivoted on a stud 261 carried by a pitman 262, which is shiftably mounted by means of a slot in its forward end, which engages the shaft 88, and by being pivotally mounted on a stud 263 in an upward extension of a lever 264 free on the stud 110 and carrying a roller 265, which coacts with the periphery of a plate cam 266 secured on the printer cam shaft 113. A spring 267 urges the pitman 262 rearwardly and the lever 264 counter-clockwise to normally maintain the roller 265 in yielding engagement with the periphery of the cam 266, as shown in FIG. 12. A spring 268, tensioned between a square stud 269 in the arm 260 and a latch 270 pivoted on a stud 271 carried by the pitman 262, urges said arm 260 and said latch 270 in opposite directions, or towards each other, to normally maintain a shoulder 272, formed on the inner edge of said arm 270, in engaging relationship with said stud 269 and to normally maintain a vertical surface adjacent to said shoulder in yielding engagement with said stud 269, as shown here.

When the pitman 262 is in its forward position (FIG. 12), an angular nose 273 on the forward end of the arm 260 engages a stud 274 in the plate 51 to rock said arm 260 counter-clockwise, against the tension of the spring 268, to maintain the stud 269 a slight distance above the shoulder 272, as shown here. Initial movement rearwardly of the pitman 262, by the spring 267 and under control of the cam 266 and the lever 264, withdraws the nose 273 from the stud 274, to permit the spring 268 to yieldingly engage the square stud 269 with the shoulder 272. Continued rearward movement of the pitman 262 causes the upper end of the latch 270 to engage a stud 275 in the plate 51 to disengage the shoulder 272 from the stud 269, as said pitman continues its rearward movement, to free the arm 260 to the action of the spring 268, which engages the tooth 259 with the ratchet teeth 258. This engagement of the tooth 259 occurs soon after the hook 225 (FIGS. 13 and 16) has engaged the tab 75 to position the next line on the check 73 in printing position and after operation of the printing mechanism, and consequently while the slide 94, the feed roll 84, and said check 73 are stationary. Continued rotation of the cam 266 restores the lever 264 clockwise and the pitman 262 forwardly, against the action of the spring 267, which movement, through the arm 260 and the tooth 259, which is now engaged with the ratchet teeth 258, carries the slide 94 forwardly in unison therewith to rotate the feed roll 84 a slight distance counter-clockwise (FIGS. 10 and 12), which in turn shifts the check 73 inwardly, or rearwardly (FIGS. 13 and 16) to move the tab 75 out of engagement with the line-finding hook 225, prior to upward restoring movement of said hook, thus preventing injury to the line-finding tab 75. After the tab 75 has been disengaged from the hook 225, forward return movement of the pitman 262 (FIG. 12) withdraws the upper end of the latch 270 from the stud 275, whereupon the spring 268 returns said latch counter-clockwise until the shoulder 272 yieldingly engages the square stud 269. Continued return movement forwardly of the pitman 262 causes the angular nose 273 to engage the stud 274 and rock the arm 260 counter-clockwise, against action of the spring 268, to disengage the tooth 259 from the ratchet teeth 258 and to shift the stud 269 upwardly, beyond the shoulder 272, whereupon the spring 268 immediately returns said shoulder beneath said stud 269 to normal position, as shown here.

An arm 277 (FIG. 13), free on a stud 278 in the left frame 50, has a downward foot-shaped extension 279, the sole of which is arranged to guide the check 73 beneath the hook 225 and the block 202, when said check is placed in its initial printing position upon the table 76. A torsion spring 280, the legs of which are tensioned between the stud 224 and a stud 281 carried by the arm 277, urges said arm clockwise to normally maintain said stud 281 in yielding engagement with an angular surface formed on the forward end of the lever 240, as shown here.

Initial movement clockwise of the lever 240 withdraws the angular surface from the stud 281 to free the arm 277 to the spring 280, which immediately rocks said arm clockwise to move its extension 279 upwardly out of the path of the check 73 when said check is moved upwardly by the tab punch 200 (FIG. 14) into engagement with the anvil 204. Return movement counter-clockwise of the lever 240 causes its angular forward end to engage the stud 281 and restore the arm 277 counter-clockwise, against the action of the spring 280, to its check-guiding position, as shown here.

*Mode of Operation*

The business system chosen to illustrate the machine embodying the present invention is that of a restaurant having a bar in connection therewith, and in such a system a check, similar to that shown in FIG. 2, is provided for the guests served at each table.

In a typical example, the waitress or server first fills in the data in the spaces provided near the top of the check 73 (FIG. 2) for a particular table, said data including the date (4–15), the number of the server (3), the number of the table (6), and the number of persons being served at the table (4). The same information is entered in the spaces provided therefor in the stub portion 74 of the check, and it will be seen that said check and its stub portion each have printed thereon an identifying number (483).

Next, the server takes the order for the drinks, in this case three bottles of beer and a cocktail, for example, and, in ordering these drinks, the server presents the check 73 to the operator or person in charge, usually bartender or the head waiter, who places said check upon the check table 76 (FIGS. 3 and 5) between the guides, and slides it inwardly or rearwardly between the feeding roller 84 and the pressure roller 81 and then outwardly or forwardly against the stop 79, to locate said check in proper printing relationship with the printing mechanism, for printing the first item upon the first line thereof.

The operator then sets up the amount of the first item (thirty cents) upon the amount key 63 (FIG. 1) and then presses the Beer key 60 to initiate an intem-entering operation, during which the value of the item and an identifying symbol (BR) are printed on line 1 in the left-hand column of the check and simultaneously entered in the item totalizer and in a group totalizer corresponding to said control key 60. Simultaneously with the printing of the first item on line 1 of the check 73, a corresponding tab 75 is punched in the right-hand edge of said check. The other two bottles of beer and the cocktail are listed separately in the same manner as explained for the first bottle of beer, and, simultaneously with the printing of said items on the corresponding lines, 2, 3, and 4, of said check 73, corresponding line-finding tabs 75 are punched in the right-hand edge of said check. At the end of each of the above item-entering operations, the check 73 is returned outwardly into viewing position but is retained against unintentional removal by the feed roller 84 (FIG. 3), which remains effective during item-entering operations to hold said check against the pressure roller 81. During each item-entering operation, the check 73 is fed inwardly full distance and then returned outwardly until the last line-finding tab 75 (FIG. 16) formed therein moves into engagement with the line-finding hook 225, which terminates forward movement of said check and locates the next line thereon in printing position.

After all of the drink items have been entered, as explained above, the operator initiates an item total operation by depressing the Service key 55, during which operation the item totalizer is cleared and the total therein ($1.50) is printed on line 5 in the right-hand column of the check 73, and an identifying symbol (SV) is printed simultaneously adjacent thereto. At the end of the item total operation, the feed roller 84 (FIG. 3) is moved downwardly to ineffective position, so that the check 73 may be removed from the machine and retained by the server.

After the drinks have been served, the guests being served order their food, and, in turning in this order, the server again presents the check 73 to the person in charge, who, as before, places the check upon the table against the stop, sets up the amount of the first food item ($2.50) on the amount keys 63 (FIG. 1), and initiates an item-entering operation by depressing the Food key 58. During this operation, the check 73 is first fed inwardly full distance and then outwardly until the last tab 75 punched in its right-hand edge engages the hook 225 (FIG. 16) to locate line 5 on said check in printing position, after which the amount of the item and an identifying symbol (FD) are printed on said line immediately opposite the item total for the drink items.

The amount ($3.00) of the second food item is set up on the amount keys in the same manner as the first item, and, in a second item-entering operation, said amount is printed on line 6 of the check 73 and simultaneously entered in the item totalizer. Next, the sales tax on the food items (seventeen cents) is set up on the amount keys 63, and the Tax key 56 is depressed to initiate a tax operation, during which the amount of the tax and an identifying symbol (TX) are printed on line 7 in the left-hand column of the check 73 and simultaneously entered in the item totalizer.

After all the food items and the tax have been entered on the check 73, the operator depresses the Service key 55 to initiate an item total operation, during which the total of the food items and the tax ($5.67) and an identifying symbol (SV) are printed on line 8 of said check, in its right-hand column.

As before, the check 73 is retained by the server, who, upon ascertaining that the guests have completed their purchases, takes the check 73 to the person in charge, who again properly places it upon the table of the machine, locating it against the fixed stop, and ascertains the amount of the first item total listed in the right-hand column of line 5 of said check, sets up the amount ($1.50) on the amount keys, and initiates an item total listing operation by depressing the List Total key 62, during which operation the item total is recorded in the left-hand column of line 8 of said check and simultaneously entered in the item totalizer. The second item total ($5.67) is entered on line 9 in exactly the same manner, after which the operator initiates a final item total operation by depressing the A item total key 53, during which operation a grand total of the drink and food items ($7.17) and a symbol (A) identifying the person in charge are printed on line 10 in the left-hand column of said check 73 and simultaneously entered in a group totalizer corresponding to the operator's key 53. After this final item total operation, the server presents the check 73 to the guests for collection of the total amount of $7.17. Finally, the server presents the check 73 to the person in charge, who separates the stub portion 74 therefrom, retains the main portion of the check, and, in some cases, returns the stub portion to the server as a duplicate record of the transaction.

The stems of the item total keys 53, 54, and 55 (FIG. 1) have locks therein, and the tips of said keys have integral therewith the keys to said locks, and said tips with their keys may be removed from the corresponding locks by the operator to whom they are assigned, to prevent operation of said keys 53, 54, and 55 by unauthorized persons.

In all item total operations controlled by the keys 53, 54, and 55 in row 1, the hammer which prints the items in the left-hand column of the check 73 is rendered inoperative, as also is the mechanism that punches the line-finding tabs 75 in the right-hand edge of said check, and, at the same time, the right-hand hammer is rendered operative to print the amount of the item total in the right-hand column of said check 73. In this case, the tab 75 punched during the entering of the last item serves to locate the check 73 in position for the printing of the item total on the next line in the right-hand column of said check.

During the course of a business period, the proprietor or other authorized person may wish to determine the extent or trend of business at the present stage of that period. This may be accomplished by moving the total control lever 65 (FIG. 1) to Read Row 1 position and then using the keys 53, 54, and 55 for initiating sub-total operations to read the amounts in the corresponding totalizers. In reading operations, the amounts of the sub-totals will be printed upon the detail strip only and simultaneously displayed by the indicators, as in the present arrangement no provision is made for printing this information upon the guest check 73. Likewise, the sub-totals of the different items may be ascertained by moving the total control lever 65 to Read Row 2 position and then using the keys 58 to 62 inclusive to select the corresponding totalizers for reading or sub-total operations, during which the amounts therein are printed upon the detail strip and simultaneously displayed by the indicators.

At the end of a business period, such as a day, for example, the proprietor or other authorized person, having the proper key to the lock 66 of the total control lever 65 (FIG. 1), may reset the totals of the machine and print a record of the amounts therein upon the detail strip, by moving said total control lever to Reset Row 1 position. The keys 53, 54, and 55 may then be used to initiate reset operations, in which the corresponding totalizers are reset to zero, and simultaneously the amounts therein are printed upon the detail strip. Next, total control lever may be moved to Reset Row 2 position, and, in reset operations initiated by use of the keys 59 to 62 inclusive, the corresponding totalizers may be reset to zero and the amounts therein printed upon the detail strip.

As explained before, the Tax key 56 has no totalizer corresponding thereto, and consequently no group total of the tax items is available in the machine as at present constructed. The Sub-Total key 57 (FIG. 1) may be used any time desired to read the amount in the item totalizer, which amount is printed only upon the detail strip and displayed by the amount indicators, in the manner explained previously.

While the form of mechanism shown and described herein is admirably adapted to fulfill the objects primarily stated, it is to be understood that it is not intended to confine the invention to the one form or embodiment disclosed herein, for it is susceptible of embodiment in various other forms, all coming within the scope and spirit of the invention.

What is claimed is:

1. In a machine of the class described, capable of performing item-entering operations, in which items are recorded in sequential order on a lined record card, the combination of amount elements to set up the values of items; control elements to initiate item-entering operations; type carriers positionable under control of the amount elements; an item-printing hammer coacting with the type carriers to print items in sequential order on the lines of the record card; means to feed the card first inwardly between the type carriers and the hammer, and then outwardly to align the first line on said card with said type carriers and said hammer; means to form a line-finding tab on the card each time an item is printed thereon; means selectively controlled by the control elements to render the hammer and the tab-forming means effective in item-entering operations to record the item set up on the amount elements on the first line of the record card, and to form a corresponding tab on said card; means including a hook-shaped member movable from a normal ineffective position to an effective position, and return, said member when in effective position engageable by the tab during outward feeding movement of the card in the second item-entering operation to interrupt said outward feeding movement to align the second line on the card with the type carriers and the hammer, whereupon operation of said hammer and the tab-forming means records the second item on the second line of the card and forms a corresponding line-finding tab on said card; and means engaging the feeding means responsive to the operation of the hammer and the tab-forming means to impart a slight inward movement to said feeding means and the card to disengage the tab from the hook-shaped member prior to return of said member to ineffective position.

2. In a machine of the class described, capable of performing item-entering operations, said machine having control elements to initiate item-entering operations, and impression means rendered effective by the control elements each item-entering operation to record the items one after another on the lines of a pre-lined record card, the combination of a table having guide means to present the card to the impression means, and having stop means to initially locate said card in proper relationship to said impression means; means to feed the card first inwardly and then outwardly to align the first line thereon with the impression means; means rendered effective by the control elements and operating in conjunction with the impression means to form a line-finding tab on the card corresponding to the second line thereon; a hook-shaped member arranged to be engaged by the tab, but normally out of engaging relationship therewith; means to support the tab for engagement with the hook-shaped member, said supporting means normally out of supporting relationship with said tab; a ratchet connected to the feeding means; pawls operatively connected to the hook-shaped member and engageable with the ratchet; means effective during outward feeding movement of the card in the second item-entering operation to move the hook-shaped member and the supporting means into engaging and supporting relationship, respectively, with the tab, whereupon said tab engages the hook-shaped member and carries it outwardly in unison therewith to engage the pawls with the ratchet to interrupt outward movement of the feeding means and the card to align the second line on said card with the impression means and with the tab-forming means, operation of which records the second item on said second line and forms a tab on said card corresponding to the third line thereon; and means engaging the feeding means responsive to the operation of the impression means and the tab-forming means to impart a slight inward movement to said feeding means and the card, to disengage the tab from the hook-shaped member, after which the moving means restores said hook-shaped member and the supporting means to ineffective position.

3. In a machine of the class described, capable of performing item-entering operations, in which items are recorded one after another on the lines of a pre-lined record card, said machine having impression means to print said items on said card, and having means to feed the card first inwardly and then outwardly in relation to the impression means, the combination of means effective each item-entering operation to form a line-finding tab on the card, said printing means and said tab-forming means operating in conjunction with each other to print a record of the item on one line of card and to simultaneously form a tab corresponding to the next line on said card, in preparation for the next item-entering operation; a hook-shaped member arranged to be engaged by the last tab formed on the card; means to support the tab in engaging relationship with the hook-shaped member, said hook-shaped member and said supporting means normally out of engaging and supporting relationship, respectively, with the tab; means to move the hook-shaped member and the supporting means into engaging and supporting relationship, respectively, with the tab during outward movement of the feeding means and the card to cause the tab to engage the hook-shaped member and to carry it outwardly in unison therewith; means operated by the hook-shaped member to interrupt outward feeding movement of the feeding means and the card to align the next line on said card with the impression means and with the tab-forming means, operation of which causes the item to be printed on said next line, and a corresponding tab to be formed on said card; and means engaging the feeding means and responsive to the operation of the impression means and the tab-forming means to impart a slight inward movement to the feeding means and the card to disengage the tab from the hook-shaped member.

4. In a machine of the class described, capable of performing item-entering operations, in each of which an item is printed on one line of a pre-lined record card, said machine having impression means to print said items, the combination of means effective each item-entering operation to feed the card first inwardly and then outwardly to initially align the first line thereon with the impression means, operation of which prints the first item on the first line of said card; means operating in conjunction with the impression means to form a line-finding tab on the card corresponding to the second line thereon; a hook-shaped member engageable by the tab; means to support the tab for engagement with the hook-shaped member, said hook-shaped member and said supporting means normally out of coacting relationship with the tab; means effective during outward feeding of the card to move the hook-shaped member and the supporting means into coacting relationship with the tab, whereupon the tab engages the hook-shaped member and carries it outwardly therewith; means including pawls operated by the hook-shaped member and a ratchet connected to the feeding means, engageable by the pawls to interrupt outward movement of the feeding means and the card to align the second line of said card with the impression means to cause the second item to be printed on said second line, and to cause a tab corresponding to the third line to be formed on said card; and means engaging the feeding means and operating in response to the operation of the impression means to print the second item, to import slight inward movement to the feeding means and the card to disengage the tab from the hook-shaped member.

5. In a machine of the class described, capable of item-entering operations and having means to print items one after the other on the lines of lined record material in such operations, the combination of means to feed the record material first inwardly and then outwardly to initially aline the first line thereon with the printing means, to receive an imprint of the first item; means operable in conjunction with the printing means to form a line-finding tab on the record material corresponding to the second line thereon; means including a hook-shaped member movable from a normal ineffective position to effective position and return, said member when in effective position engageable and operable by the tab, during outward movement of the feeding means and the record material in the succeeding item-entering operation, to aline the second line on said record material with the printing means, to receive an imprint of the second item; and means coacting with the feeding means responsive to the operation of the printing means and the tab-forming means to impart inward movement to said feeding means and the record material to disengage the tab from the hook-shaped member prior to return of said member to ineffective position.

6. In a machine of the class described, having mechanism to print items on lined record material, the combination of means to feed the record material inwardly a certain extent and outwardly a lesser extent, to aline the first line thereon with the printing mechanism, after which said printing mechanism functions to record the first item on said first line; means operating in conjunction with the printing mechanism to form a line-finding tab on one edge of the record material corresponding to the second line thereon; a hook-shaped line-finding member movable from a normal ineffective position to an effective position and return, said member when in effective position engageable and operable by the tab during outward feeding movement of the record material; means including a ratchet connected to the feeding means and pawls connected to the hook-shaped member and engageable with the ratchet upon operation of said member to interrupt outward feeding movement of the feeding means and the record material to aline the second line on said record material with the printing mechanism and to aline said record material in proper relationship with the tab-forming means; and means engaging the feeding means responsive to the operation of the printing mechanism and the tab-forming means to impart a slight inward movement to said feeding means and the record material to disengage the tab from the hook-shaped member prior to return of said member to ineffective position.

7. In an automatic line-finding mechanism for a machine of the class described, said machine capable of performing item-entering operations and having means to print the value of each item entered in sequential order on the lines of the pre-lined record card, the combination of means operating in conjunction with the item-printing means to form a line-finding tab on the card; means to feed the card first inwardly and then outwardly to aline the first line thereon in proper relationship to the item-printing means and to the tab-forming means, whereupon operation of said printing and said tab-forming means in the first item-entering operation causes the value of the first item to be printed on the first line of said card, and causes a corresponding line-finding tab to be formed on said card; means including a hook-shaped member engageable by the tab during outward feeding movement of the card, said hook-shaped member normally out of engaging relationship with said tab; means effective during outward feeding movement of the card to move the hook-shaped member into engaging relationship with the tab, whereupon, in the second and all subsequent item-entering operations, the corresponding tab engages the hook-shaped member and carries it outwardly in unison therewith; means connected to the hook-shaped member and effective during outward movement of said member to interrupt outward feeding movement of the feeding means and the record card to locate the second and subsequent lines on said card in proper relationship to the printing means and to the tab-forming means, after which operation of said printing means and said tab-forming means causes the second and subsequent items to be printed on the corresponding lines of the card, and causes corresponding tabs to be formed on said card; and means engaging the feeding means responsive to operation of the printing means and the tab-forming means to impart a slight inward movement to said feeding means and the record card to disengage the tab from the hook-shaped member, whereupon the moving means restores said hook-shaped member to ineffective position.

References Cited in the file of this patent
UNITED STATES PATENTS

| | | |
|---|---|---|
| 2,111,116 | Holzapfel | Mar. 15, 1938 |
| 2,244,252 | Keen | June 3, 1941 |
| 2,281,577 | Haynes | May 5, 1942 |
| 2,346,145 | Bliss | Apr. 11, 1944 |
| 2,424,073 | Ayres | July 15, 1947 |
| 2,558,947 | Furman | July 3, 1951 |
| 2,670,068 | Rutishauser | Feb. 23, 1954 |
| 2,774,457 | Salzberger | Dec. 18, 1956 |
| 2,884,851 | Werner et al. | May 5, 1959 |
| 2,916,129 | Parker | Dec. 8, 1959 |

UNITED STATES PATENT OFFICE
CERTIFICATE OF CORRECTION

August 6, 1963

Patent No. 3,100,037

Albert J. Green et al.

It is hereby certified that error appears in the above numbered patent requiring correction and that the said Letters Patent should read as corrected below.

Column 7, line 57, for "and" read -- to --; column 15, line 26, for "intem-entering" read -- item-entering --.

Signed and sealed this 25th day of February 1964.

(SEAL)
Attest:
ERNEST W. SWIDER

EDWIN L. REYNOLDS
Acting Commissioner of Patents

Attesting Officer